US009927248B2

(12) United States Patent
Spiro et al.

(10) Patent No.: US 9,927,248 B2
(45) Date of Patent: Mar. 27, 2018

(54) NAVIGATION SYSTEM AND METHOD FOR PROVIDING A NAVIGATIONAL ROUTE

(71) Applicant: MOTOROLA SOLUTIONS, INC., Schaumburg, IL (US)

(72) Inventors: Alexander R. Spiro, Astoria, NY (US); Alejandro G. Blanco, Fort Lauderdale, FL (US); Kenneth W. Douros, South Barrington, IL (US); Randy L. Ekl, Lake Zurich, IL (US); Irina Kleyman, Wheeling, IL (US); Catherine S. Witkin, New York, NY (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 45 days.

(21) Appl. No.: 15/096,816

(22) Filed: Apr. 12, 2016

(65) Prior Publication Data

US 2017/0292844 A1    Oct. 12, 2017

(51) Int. Cl.
*G01C 21/34* (2006.01)
(52) U.S. Cl.
CPC ......... *G01C 21/34* (2013.01); *G01C 21/3492* (2013.01)

(58) Field of Classification Search
CPC ............................ G01C 21/34; G01C 21/3492
See application file for complete search history.

(56) References Cited

U.S. PATENT DOCUMENTS

| 2007/0138347 A1* | 6/2007 | Ehlers ............... G01C 21/3461 246/1 R |
| 2012/0078506 A1* | 3/2012 | Husain ............... G01C 21/3492 701/414 |

\* cited by examiner

*Primary Examiner* — Michael D Lang
(74) *Attorney, Agent, or Firm* — Michael Best & Friedrich LLP (57) ABSTRACT

A system and method for providing navigational routing. The method includes determining, at a controller, a first route from a first location to a second location, the determination of the first route using a first set of routing rules. The method also includes determining, at the controller, a second route from the first location to the second location, the determination of the second route using a second set of routing rules applicable to public safety vehicles, the second set of routing rules different from the first set of routing rules. The method further includes the steps of accessing, at the controller, route information related to the second route; identifying, at the controller, a preferred route based on the first travel duration, the second travel duration, and the route information; and outputting the identified preferred route.

25 Claims, 6 Drawing Sheets

NAVIGATION SYSTEM AND METHOD FOR PROVIDING A NAVIGATIONAL ROUTE

BACKGROUND OF THE INVENTION

Navigation systems, such as automotive navigation systems, provide a user with a navigation route from a starting location to a desired destination. A navigation system may obtain the starting location and the desired destination, and then use a mapping algorithm to generate a navigation route from the starting location to the desired destination that minimizes travel time or distance. When generating the navigation route, the mapping algorithm may also consider a set of traffic rules by which the navigation route must abide. For example, a particular road may be a one-way road and the traffic rules indicate to the mapping algorithm that a navigation route cannot include travel against the direction of traffic on the one-way road. Accordingly, the mapping algorithm may generate a navigation route that abides by traffic rules and provides the shortest travel time or distance from a starting location to a desired destination.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments of the invention provide a method for providing navigational routing. The method includes the steps of determining, at a controller, a first route from a first location to a second location, the determination of the first route using a first set of routing rules, and determining, at the controller, a second route from the first location to the second location, the determination of the second route using a second set of routing rules applicable to a public safety vehicle, the second set of routing rules different from the first set of routing rules. The method further includes the steps of accessing, at the controller, information related to the second route; identifying, at the controller, a preferred route based on the first route, the second route, and the information; and outputting the identified preferred route.

Another embodiment of the invention provides a method for providing navigational routing. The method includes the steps of determining, at a controller, a first route from a first location to a second location, the determination of the first route using a first set of routing rules, and determining, at the controller, a second route from the first location to the second location, the determination of the second route using a second set of routing rules applicable to public safety vehicles different from the first set of routing rules. The method further includes accessing, by the controller, information related to the second route, the information including real-time condition information associated with the second route; identifying, at the controller, a preferred route based on the first route, the second route, and the information; and outputting the identified preferred route.

In yet another embodiment, the invention provides a navigation device for providing navigational routing. The navigation device includes a memory and an electronic processor electrically coupled to the memory. The electronic processor is configured to determine a first route from a first location to a second location, the determination of the first route using a first set of routing rules, and determine a second route from the first location to the second location, the determination of the second route using a second set of routing rules applicable to public safety vehicles different from the first set of routing rules. The electronic processor is further configured to access information related to the second route, identify a preferred route based on the first route, the second route, and the information, and output the identified preferred route.

Figure 1:
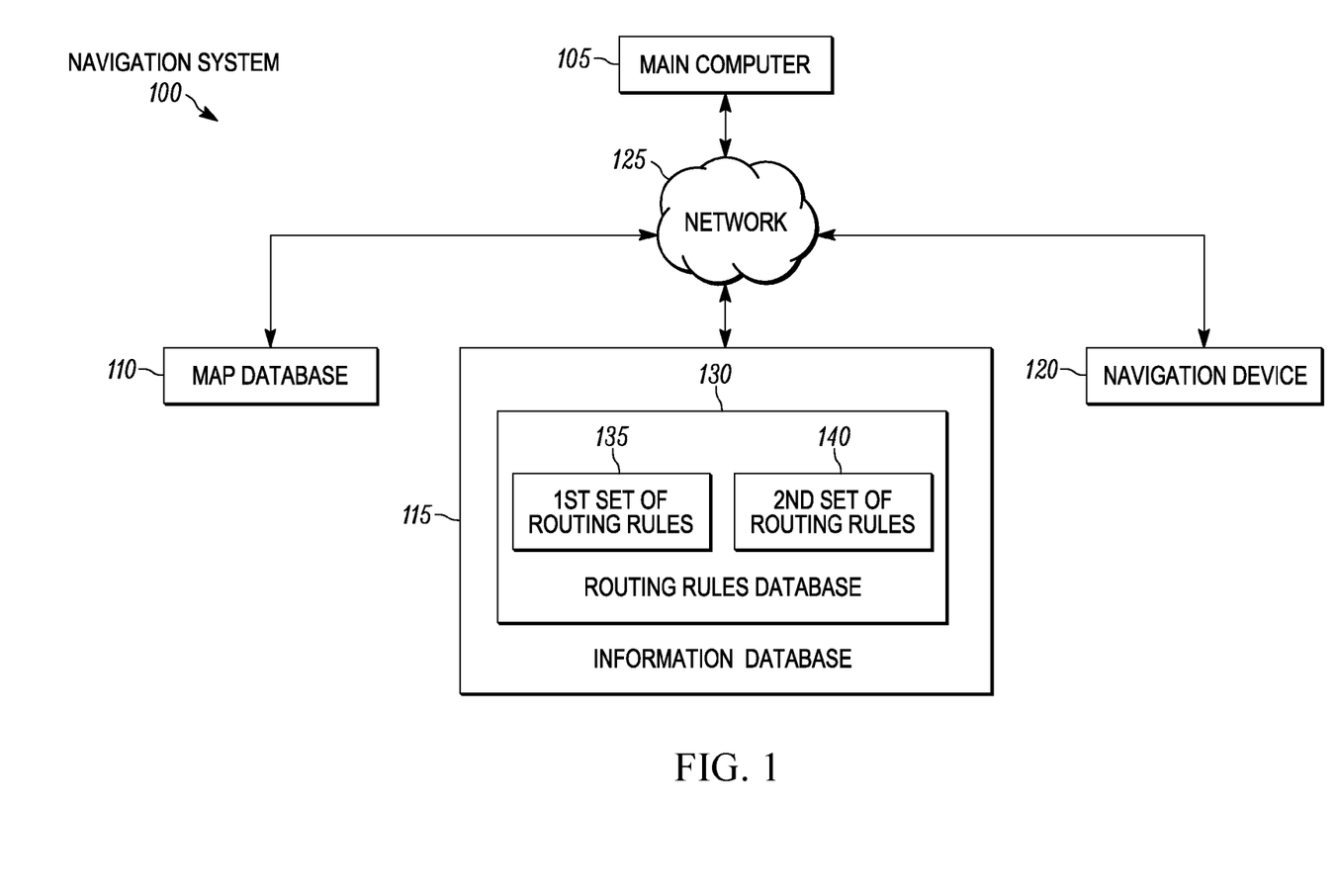
FIG. 1 is a block diagram of a navigation system for providing a user with a navigation route in accordance with some embodiments.

FIG. 1 is a block diagram of a navigation system 100 for providing a navigation route. The navigation system 100 may include a main computer 105. The main computer 105 may be communicatively coupled to, and receive information from, a map database 110, an information database 115, and a navigation device 120. Although illustrated in FIG. 1 as being an individual map database 110 and an individual information database 115, these databases may include one or more map databases 110 and one or more information databases 115, respectively. Additionally, the navigation system 100 may include more than one of the navigation device 120 in communication with the main computer 105.

The information database 115 includes a routing rules database 130 having a first set of routing rules 135 and a second set of routing rules 140. The first set of routing rules 135 and the second set of routing rules 140 each include a set of routing rules used by, for example, a mapping algorithm to generate a navigation route. Particular routing rules may specify a speed limit, direction of traffic, turn-only lanes, among other traffic rules. In some embodiments, the first set of rules 135 are applicable to civilian vehicles, while the second set of rules 140 are applicable to public safety vehicles. Public safety vehicles may include, for example, law enforcement vehicles, emergency medical technician (EMT) vehicles, firefighter vehicles, rescue vehicles, other public vehicles having special status granted by a jurisdiction, and the like. In some embodiments, the second set of routing rules 140 may be dependent on the type of public safety entity presently using the navigation system 100. For example, in such an embodiment, the second set of routing rules 140 may include a first group of routing rules when the public safety vehicle is a law enforcement vehicle, a second group of routing rules when the public safety vehicle is a firefighter vehicle, and a third group of routing rules when the public safety vehicle is an emergency medical technician vehicle. Additionally, in some embodiments, the second set of routing rules 140 may be dependent on the type of incident. For example, in such an embodiment, the second set of routing rules 140 may include a fourth group of routing rules when the incident is a high-level incident (e.g., an incident involving death or severe bodily harm) and a fifth group of routing rules when incident is a low-level incident (e.g., an incident involving unarmed robbery).

Jurisdictions (e.g., municipalities, villages, towns, cities, counties, states, etc.) may include exceptions to civilian traffic rules for public safety vehicles in an emergency response situation. For example, while civilian traffic may be prohibited from traveling a particular direction on a one-way road, public safety vehicles may be permitted to travel either direction on the one-way road (with or against traffic) when responding to an emergency situation, such as a car accident or a house fire. Other example public safety vehicle traffic rule exceptions include traveling on a pedestrian path in a park, traveling through a parking lot, proceeding through a red light, driving above a speed limit, among others.

Accordingly, the second set of routing rules 140 that are applicable to public safety vehicles may include exceptions to civilian traffic conventions (e.g., as specified in the first set of routing rules 135) that are applicable to public safety vehicles.

In some embodiments, the information database 115 includes one or more further sets of routing rules in addition to the first set of rules 135 and the second set of routing rules 140. Such further sets of routing rules may be applicable to civilian traffic or public safety vehicles in various additional jurisdictions or may be applicable to subsets of civilian traffic or public safety vehicles within the same jurisdiction. The generation of routes and identification of the preferred route 230 is discussed in further detail below.

Communication between the main computer 105 and various components can occur through a network 125. In some embodiments, the network 125 is, for example, a wide area network (WAN) (e.g., a transport control protocol/internet protocol (TCP/IP) based network, a cellular network, such as, for example, a Global System for Mobile Communications (or Groupe Spécial Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3GSM network, a 4GSM network, a Digital Enhanced Cordless Telecommunications (DECT) network, a Digital advanced mobile phone system (AMPS) (IS-136/time division multiple access (TDMA)) network, or an Integrated Digital Enhanced Network (iDEN) network, and the like). In other embodiments, the network 125 is, for example, a local area network (LAN), a neighborhood area network (NAN), a home area network (HAN), a vehicular area network (VAN), or personal area network (PAN) employing any of a variety of communications protocols, such as Wi-Fi®, Bluetooth®, ZigBee®, and the like. Other wide area networks, such as land mobile radio (LMR), terrestrial trunked radio (TETRA), and digital mobile radio (DMR) may also be used. In another embodiment, the main computer 105, the map database 110, and the information database 115 are combined into a single system. In such an embodiment, the single system is communicatively coupled to the one or more navigation devices 120 through the network 125.

Figure 2:
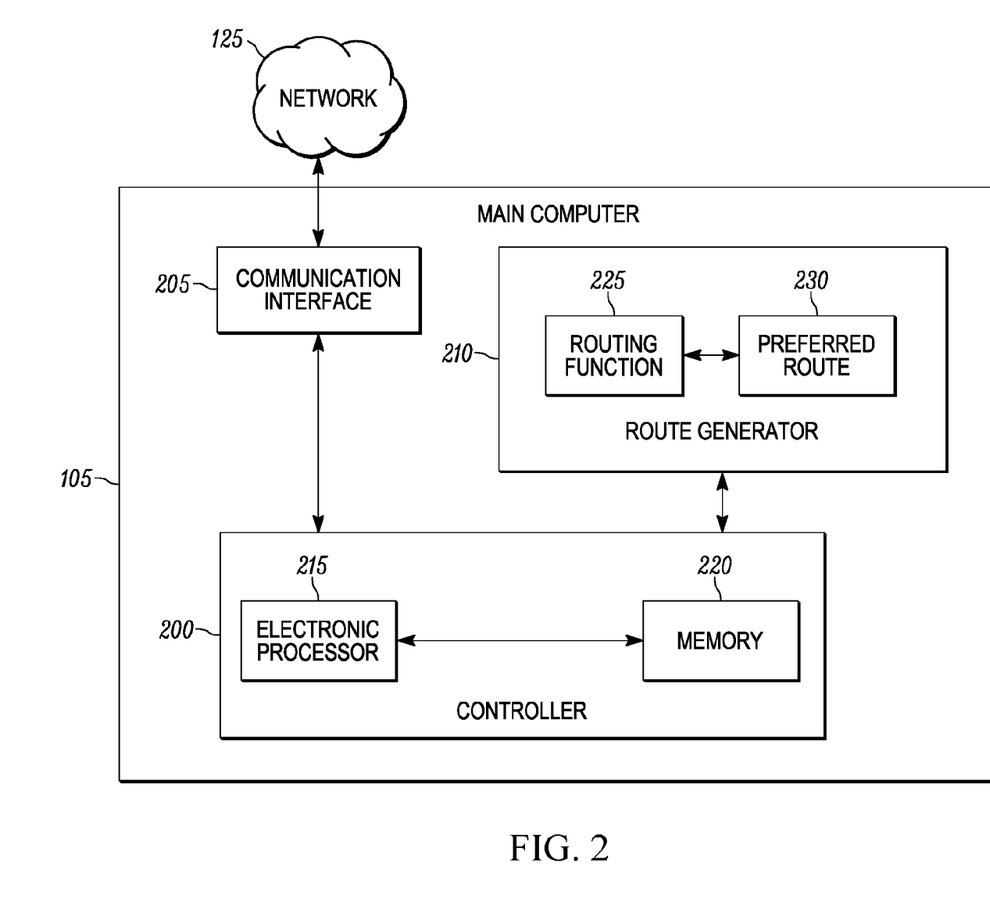
FIG. 2 is a block diagram of a main computer of the navigation system of FIG. 1 in accordance with some embodiments.

FIG. 2 is a block diagram of the main computer 105. The main computer 105 includes a controller 200, an communication interface 205, and a route generator 210. The controller 200 is electrically and/or communicatively connected to a variety of modules or components of the main computer 105. For example, the illustrated controller 200 is connected to the communication interface 205 and the route generator 210. The controller 200 includes combinations of hardware and software that are operable to, among other things, control the operation of the main computer 105. The controller 200 is configured to retrieve from memory (for example, a memory 220 or external memory) and execute, among other things, instructions related to the control processes and methods described herein. In other constructions, the controller 200 includes additional, fewer, or different components.

In some embodiments, the controller 200 includes a plurality of electrical and electronic components that provide power, operational control, and protection to the components and modules within the controller 200 and/or the main computer 105. For example, the controller 200 includes, among other things, an electronic processor 215 (for example, a microprocessor or another suitable programmable device) and the memory 220.

The memory 220 includes, for example, a program storage area and a data storage area. The program storage area and the data storage area can include combinations of different types of memory, such as read-only memory (ROM), random access memory (RAM) (e.g., dynamic RAM (DRAM), synchronous DRAM (SDRAM), and the like), electrically erasable programmable read-only memory (EEPROM), flash memory, a hard disk, a Secure Digital (SD) card, or other suitable magnetic, optical, physical, or electronic memory devices. The electronic processor 215 is communicatively coupled to the memory 220 and executes software instructions that are stored in a RAM of the memory 220 (e.g., during execution), a ROM of the memory 220 (e.g., on a generally permanent basis), or another non-transitory computer readable medium such as another memory or a disc. The software may include one or more applications, program data, filters, rules, one or more program modules, and other executable instructions.

The communication interface 205 provides a communication link between the main computer 105 and the network 125. Thus, communication interface 205 enables the main computer 105 to communicate with the map database 110, the information database 115, and the navigation device 120 via the network 125. Communications through the network 125 can be protected using one or more encryption techniques, such as those techniques provided in the Institute of Electrical and Electronic Engineers (IEEE) 802.1 (www.ieee802.org/1/) standard for port-based network security, pre-shared key, Extensible Authentication Protocol (EAP), Wired Equivalency Privacy (WEP), Temporal Key Integrity Protocol (TKIP), Wi-Fi Protected Access (WPA), and the like. The connections between the communication interface 205 and the network 125 are, for example, wired connections, wireless connections, or a combination of wireless and wired connections. In some embodiments, the main computer 105 or the communication interface 205 include one or more communications ports (e.g., Ethernet, serial advanced technology attachment (SATA), universal serial bus (USB), integrated drive electronics (IDE), and the like) for transferring, receiving, or storing data associated with the navigation system 100.

The route generator 210 receives information (through the network 125, communication interface 205, and controller 200) from the map database 110, the information database 115, and the navigation device 120. The route generator 210 uses the received information, along with a routing function 225, to identify a preferred route 230. In some embodiments, the preferred route 230 is selected from a first route from a first location to a second location and a second route from the first location to the second location. In such an embodiment, the first route may be generated by the routing function 225 based on the first set of routing rules 135 that are applicable to civilian vehicles, while the second route may be generated by the routing function 225 based on the second set of routing rules 140 that are applicable to public safety vehicles. In some embodiments, the preferred route 230 is selected from three or more routes generated by the routing function 225. Additionally, in some embodiments, the route (for example, the first route and the second route) may include additional location points located along the route. For example, the additional location points may correspond to waypoints (e.g., one or more additional incidents) along the route. The generation of routes and identification of the preferred route 230 is discussed in further detail below.

In some embodiments, the route generator 210 is implemented in whole or in part in software. In some embodiments, the route generator 210 is not a separate component, but rather is implemented by the controller 200. For example, the routing function 225 is implemented using software stored on the memory 220 of the controller 200 and executed by the electronic processor 215 of the controller 200 and the preferred route 230 is stored in the memory 220.

In some embodiments, the map database 110 and the information database 115 (FIG. 1) each include an input/output interface and a controller similar to the main computer 105 shown in FIG. 2. In other words, the map database 110 and the information database 115 each include an input/output interface to communicate with other components, either directly or via the network 125, and a controller to carry out the functionality attributed to each of the map database 110 and the input/output interface 115, respectively, as described herein. In other embodiments, the map database 110 and the information database 115 are implemented in whole or in part in software stored on the memory 220 of the controller 200 and executed by the electronic processor 215 of the controller 200.

The map database 110 provides map data to the main computer 105 to be used by the route generator 210. More particularly, the map data may include one or more maps having roads, pathways, rails, parks, terrain information (e.g., indicating altitude changes, such as but not limited to, altitude changes that are impassable by public safety vehicles (e.g., cliffs)), speed limit information for roads, direction of travel restrictions for roads (e.g., to indicate whether a road is a one-way road), traffic light information for roads, traffic sign information (e.g., yield signs and stop signs), lane information for roads (e.g., whether a lane is turn-only and requires turning), parking lots, land and structures (residential, commercial, industrial), labels thereof (e.g., street names, park names, and business names), and the like. The map data provided to the route generator 210 may correspond to a geographic area including at least the first location and second location, as well as intervening areas.

Figure 3:
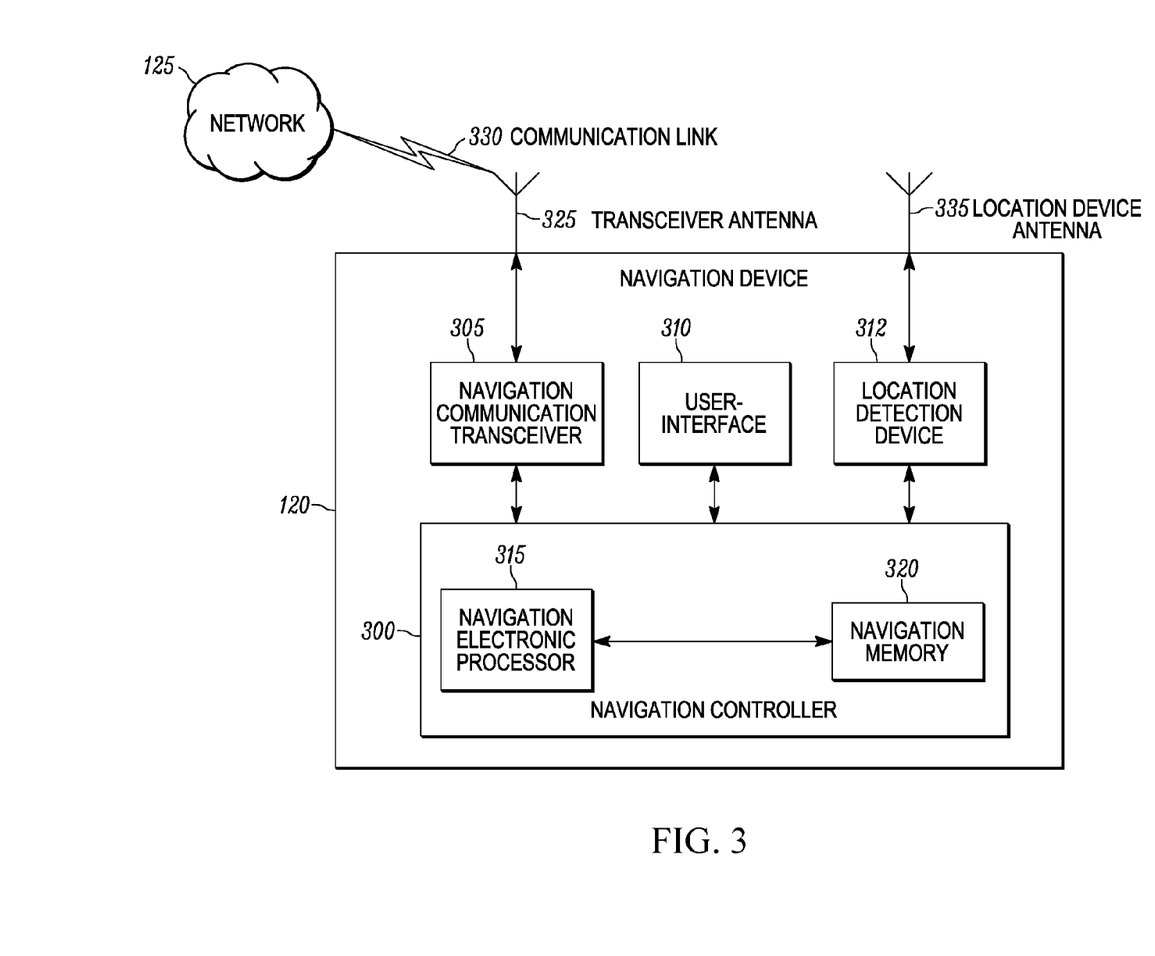
FIG. 3 is a block diagram of a navigation device of the navigation system of FIG. 1 in accordance with some embodiments.

The information database 115 provides additional information to the route generator 210. More particularly, the information database 115 may provide the route generator 210 with additional information related to, among other things, a real-time and/or historical traffic density, real-time and/or historical pedestrian density, real-time traffic light information, current weather, current time-of-day, locations of other public safety vehicles in the area, driving patterns along the second route, driving patterns during a selected time-of-day, and information on a related emergency response. As an example of additional information on a related emergency response, when a suspect is currently being pursued as part of the emergency response, the additional information may include which, if any, traffic laws have been violated by the suspect, and whether a current user (e.g., law enforcement office, firefighter, etc.) will be a first to arrive at the second location. In some embodiments, the information database 115 may provide the additional information by accessing real-time video and records databases, for example, over the network 125. In some embodiments, the real-time video is accessed from one or more surveillance cameras located along the first route and/or second route. FIG. 3 is a block diagram of the navigation device 120. In some embodiments, the navigation device 120 is a personal or hand-held device, such as but not limited to, a smart telephone, a tablet, a laptop, a heads-up display, a pair of head-mounted glasses, a worn vibration device (for example, wristwatches, vests, and the like), and an audio device.

FIG. 3 is a block diagram of the navigation device 120. The navigation device 120 includes a navigation controller 300, a navigation communication transceiver 305, a user-interface 310, and a location detection device 312. The navigation controller 300 is electrically and/or communicatively coupled to a variety of modules or components of the navigation device 120. For example, the illustrated navigation controller 300 is coupled to the navigation communication transceiver 305, the user-interface 310, and the location detection device 312. The navigation controller 300 includes combinations of hardware and software that are operable to, among other things, control the operation of the navigation device, for example, a navigation electronic processor 315 and a navigation memory 320.

The navigation communication transceiver 305 is communicatively coupled to the navigation controller 300. The navigation communication transceiver 305, along with the transceiver antenna 325, provides a wireless communication link 330 between the navigation controller 300 and the network 125. In other embodiments, rather than the navigation communication transceiver 305 and transceiver antenna 325, the navigation device 120 may include separate transmitting and receiving components, for example, a transmitter and transmitting antenna and a receiver and receiving antenna. In further embodiments, the navigation device 120 may include a wired connection to the network 125.

The user-interface 310 is communicatively coupled to the navigation controller 300. The user-interface 310 is used to receive user input and/or provide user output. The user-interface 310 includes one or more input devices and one or more output devices. The input devices include, for example, touch-screen displays, a plurality of knobs, dials, switches, and/or buttons. The output devices include, for example, speakers and/or a display (for example, a primary display, a second display).

The location detection device 312 is communicatively coupled to the navigation controller 300. The location detection device 312, along with a location device antenna 335, is used to detect a location of the navigation device 120. For example, the location detection device 312 may include a satellite-based positioning system that receives and analyzes satellite signals to determine global coordinates (for example, latitude, longitude, and altitude) of the navigation device 120. Examples of such satellite-based positioning systems include the global navigation satellite system (GNSS), global positioning system (GPS), and the like. In other embodiments, rather than the location detection device 312 and the location device antenna 335, the navigation device 120 may include only receiving components or may include separate transmitting and receiving components, for example, a transmitting location device and transmitting antenna and a receiving location device and receiving antenna. In some embodiments, the location detection device 312 uses other location detection techniques in addition to or in place of the satellite-based positioning, such as cellular telephone navigation including one or more of, for example, triangulation, multilateration, network-based tracking, handset-based tracking, subscriber identification module (SIM) based tracking, WiFi-based tracking, and the like.

As indicated above, the navigation device 120 also provides information to the main computer 105 to be used by the route generator 210 in determining the preferred route 230. More particularly, the navigation device 120 may provide the main computer 105 with information related to, among other things, a first location, a second location, an exception use level, and an urgency level. In some embodiments, the first location corresponds to the current location of the navigation device 120, which may be determined using the location detection device 312.

The second location corresponds to a desired destination. In some embodiments, the first location, the second location, the exception use level, and the urgency level may be input by a user through the user-interface 310. In some embodiments, one or more of the first location, the second location, the exception use level, and the urgency level may be provided to the main computer 105 by another device over the network 125, such as a dispatch controller associated with a dispatch center for public safety vehicles and personnel.

The exception use level may be a value within a range (for example, within a numerical range of one to ten). In some embodiments, the selected exception use level corresponds to the desirability to employ public safety vehicle traffic rule exceptions in the preferred route 230.

The urgency level may also be a value within a range (for example, within a numerical range of one to ten). In some embodiments, the selected urgency level corresponds to the urgency of the incident, or situation, occurring at the second location or the urgency for the user to arrive at the second location. For example, a medical emergency may have a higher urgency level than a minor traffic accident. Additionally, in some embodiment, the urgency level may be determined based on the type of public safety entity presently using the navigation system 100.

As described in further detail below, in some embodiments, the higher the exception use level and the higher the urgency use level, the more likely the route generator 210 is to include public safety vehicle traffic rule exceptions in the preferred route 230, while the lower the exception use level and the lower the urgency use level, the less likely the route generator 210 is to include public safety vehicle traffic rule exceptions in the preferred route 230. The exception use level and the urgency level may be generally independent of each other such that, for example, one may be relatively high and the other may be relatively low in some instances, and, in other instances, both may be at similar relative values.

In some embodiments, the second set of routing rules that are applicable to public safety vehicles are determined by the route generator 210 based on the first location (e.g., the current position of the navigation device 120). For example, the route generator 210 may access the rules database 130 (FIG. 1) using the first location, and receive from the rules database the local jurisdictional rules (e.g., local municipality rules, local village rules, local town rules, local city rules, local county rules, local state rules, etc.) that are applicable to public safety vehicles in that area. In some embodiments, the route generator 210 may also provide the second location (e.g., the destination) to the rules database 130 when the first and second location are in different jurisdictions to obtain the local rules that are applicable to public safety vehicles at both locations. In some embodiments, in addition to or instead of location information, the route generator 210 may also provide type of vehicle information, type of incident information, or both, to the rules database 130 to obtain a second set of routing rules applicable to one or more of the particular vehicle type, incident type, and location.

In another embodiment, the navigation device 120 includes the route generator 210. In such an embodiment, the route generator 210 communicates (for example, through the navigation controller 300, navigation communication transceiver 305, and network 125) with the map database 110 and the information database 115 to receive one or maps and information and determine the preferred route 230. In such an embodiment, the navigation device 120 may or may not be in communication with the main computer 105. Rather, in such an embodiment, the navigation device 120 may act as a stand-alone device.

Figure 4:
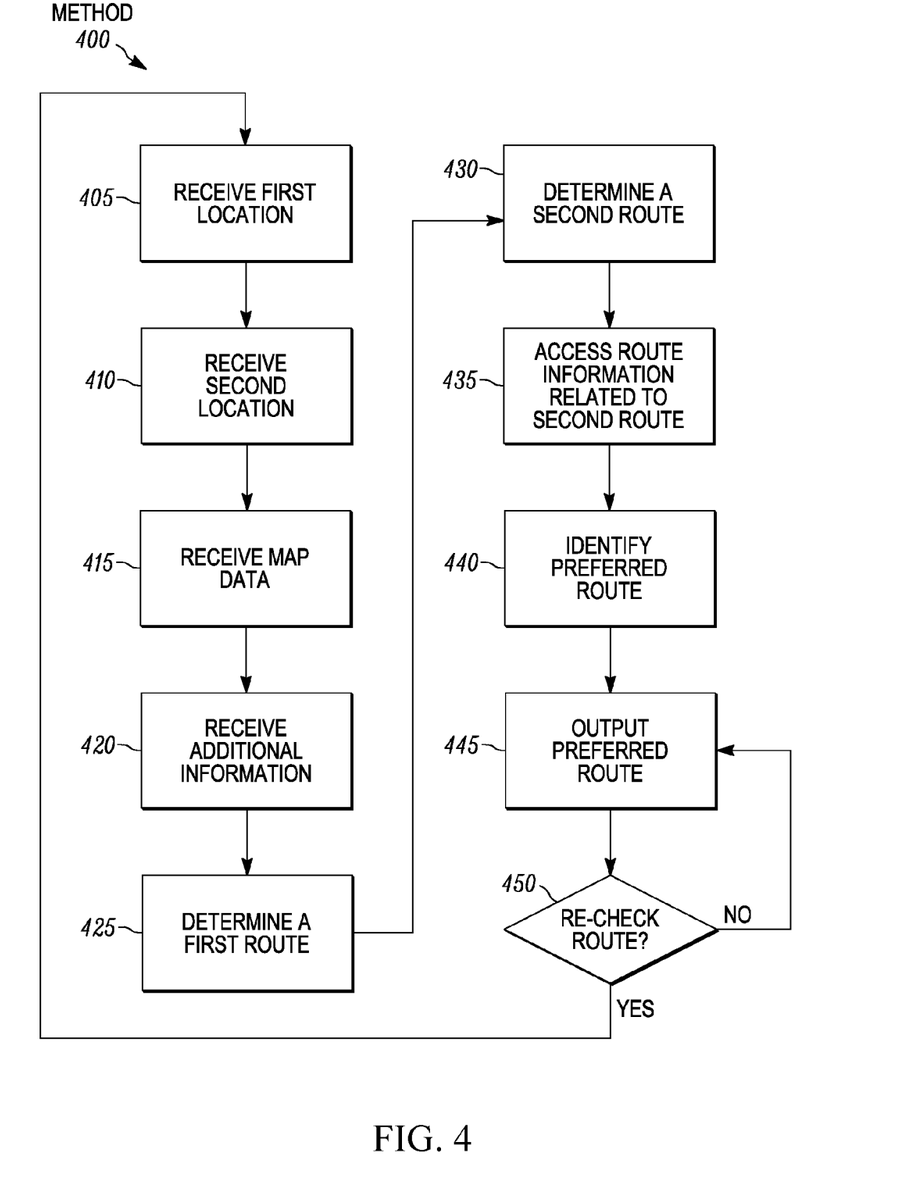
FIG. 4 is flowchart illustrating an exemplary method for determining a preferred route in accordance with some embodiments.

FIG. 4 is a flowchart illustrating an exemplary method 400 for determining a preferred route 230 between the first location and the second location. In some embodiments, the method 400 is performed by the route generator 210. The route generator 210 receives the first location (block 405). The first location may be a current location of the navigation device 120, which may be provided by the navigation device 120 based on a determination by the location detection device 312. The first location may alternatively be a desired start location that is different than the current location of the navigation device 120, which may be, for example, entered by a user via user-interface 310. The route generator 210 also receives the second location (block 410). The second location is a desired end location that may be, for example, entered by the user via user-interface 310 or received from a dispatch controller. The route generator 210 receives map data from the map database 110 (block 415). The route generator 210 may provide to the map database 110 the first and second locations, and the map database 110 may respond with map data corresponding to the geographic areas including the first and second locations. At block 420, the route generator 210 receives additional information from the information database 115, including but not limited to, information from the routing rules database 130 (e.g., the first set of routing rules 135 and the second set of routing rules 140). For example, the route generator 210 may provide the received map data or the first and second locations to the information database 115, and the information database 115 may respond with additional information corresponding to the geographic areas included in the map data or the geographic area including the first and second locations. Additionally, the second set of routing rules 140 may be determined, by the route generator 210, based on the type of emergency vehicle, the type of incident, or both. For example, the route generator 210 may provide the type of emergency vehicle and the type of incident, or both, along with a request for additional information from the information database 115 as part of block 420. In response, the information database 115 provides rules applicable to the type of emergency vehicle, type of incident, or both, as the second set of routing rules 140. The blocks 405, 410, 415, and 420 may collectively be referred to as a block of receiving routing information by the route generator 210.

In block 425, the route generator 210 determines a first route between the first location and the second location using the first set of routing rules 135. In some embodiments, the first set of routing rules 135 follow standard traffic conventions for civilian vehicles. For example, standard traffic conventions for civilian vehicles may include stopping at stop signs, travelling the correct way on a one-way street, avoiding pedestrian walkways, and avoiding travelling through parking lots. The route generator 210 also determines a second route between the first location and the second location using the second set of routing rules 140, which, as noted, are applicable to public safety vehicles and includes one or more exceptions to civilian traffic conventions (block 430). Accordingly, the second route may violate civilian traffic conventions, but will follow rules applicable to public safety vehicles. To generate the first route and the second route, the routing function 225 of the route generator 210 may execute one or more mapping algorithms, such as Dijkstra's algorithm, alternative routing or mapping algorithms, or variations thereof, that use as inputs the first location, the second location, the map data, and the additional information that is received in blocks 405, 410, 415, and 420, and that are constrained by the first and second set of routing rules 140. For example, with respect to the constraints of the rules, while the first set of routing rules 135 may prevent a mapping algorithm from using a particular path when that path includes travel in a direction against traffic on a one-way street, the second set of routing rules 140 may not impose such a constraint.

Figure 5:
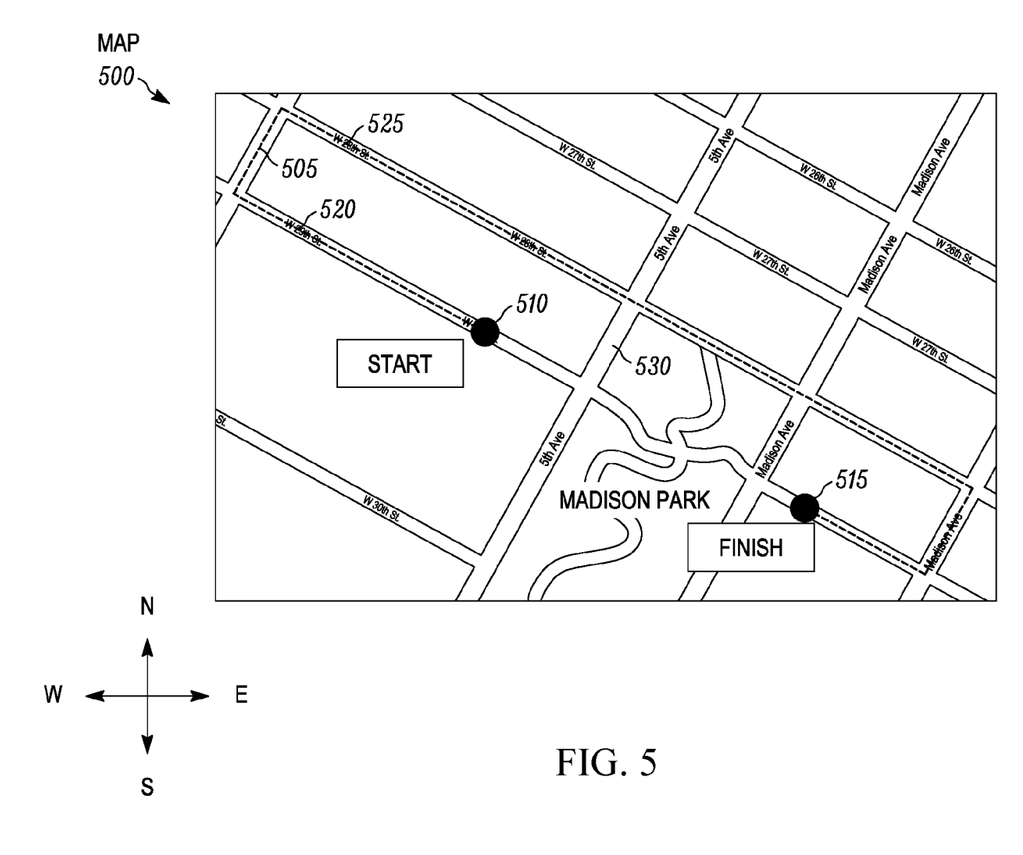
FIG. 5 is an exemplary map that may be used by the navigation system of FIG. 1 in accordance with some embodiments.
Figure 6:
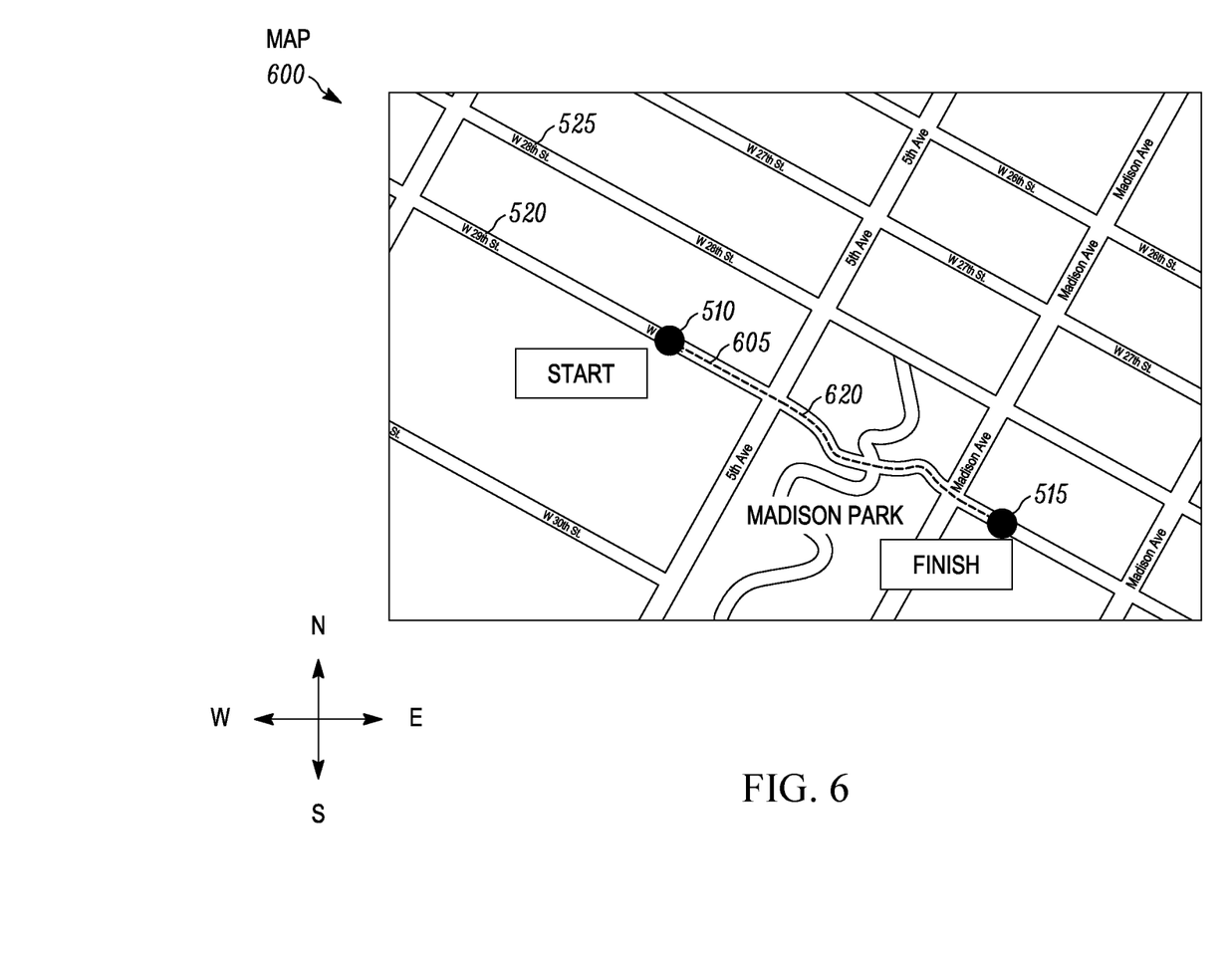
FIG. 6 is a second exemplary map that may be used by the navigation system of FIG. 1 in accordance with some embodiments.

FIGS. 5 and 6 illustrate exemplary maps incorporating routes that may be generated using the method 400, particularly blocks 405, 410, 415, 420, 425, and 430 of the method 400. FIG. 5 illustrates an exemplary map 500 including a first route 505, a first location 510, and a second location 515. The first location 510 and the second location 515 may be received in blocks 405 and 410, respectively, of method 400. The underlying map data including the various streets, pathways, labels, may be received by the route generator 210 from the map database 110 in block 415. The first route 505 may be generated by the route generator 210 using the first set of routing rules 135, which follow standard traffic conventions for civilian vehicles. For example, the first route 505 begins by traveling north-west along the direction of traffic on a one-way street 520 to abide by the first set of routing rules 135 before turning to reach street 525, rather than taking a shorter path including traveling south-east on street 520 (against traffic) and a connecting street 530 to reach street 525.

FIG. 6 illustrates a second exemplary map 600. The second exemplary map 600 also includes the first location received in block 405, the second location received in block 410, and the map data obtained in block 415. The second exemplary map 600 further includes a second route 605 that may be generated in block 430 by the route generator 210 using the second set of routing rules 140, which are applicable to public safety vehicles. For example, the second route 505 begins by traveling south-east against the direction of traffic on the one-way street 520 and then through a park along a pedestrian pathway 610. Traveling against the direction of traffic on a one-way street and along a pedestrian pathway may both contradict the first set of routing rules 135, but are acceptable in the second set of routing rules 140 because of public safety vehicle traffic exceptions.

Returning to FIG. 4, after the first route and the second route are determined in block 425 and block 430, the route generator 210 proceeds to block 435 to access route information related to the second route. The route information may be a subset of the additional information previously received from the information database 115 in block 420. In other embodiments, the route generator 210 accesses the information database 115 again in block 435 to obtain the route information. The route information may include, among other items, real-time condition information, for example, traffic density along the first route, traffic density along the second route, pedestrian density along the first route, pedestrian density along the second route, current weather, the type and number of public safety vehicle traffic exceptions along the second route, the exception use level, the urgency level, and the like.

In block 440, the route generator 210 identifies the preferred route 230. In particular, the routing function 225 of the route generator 210 selects the first route or the second route as the preferred route 230. To select the preferred route 230, the routing function 225 receives and analyzes one or more of a first duration of the first route, a second duration of the second route, and the route information from the information database 115. The routing function 225 may employ various techniques to analyze this data and identify the preferred route 230. For example, in some embodiments, the routing function 225 uses one or more decision trees to determine the preferred route 230. In another embodiment, the routing function 225 uses a rule-based system to determine the preferred route 230. In yet another embodiment, the routing function 225 weights the received information in order to determine the preferred route 230. In such an embodiment, the received information may be weighted based on the type of information received.

In one example, to identify the preferred route 230, the routing function 225 may calculate a score for the second route. When the score is at or exceeds a threshold, the routing function 225 identifies the second route as the preferred route 230 in block 440, and when the score does not exceed the threshold, the routing function 225 identifies the first route as the preferred route 230 in block 440. The score may be calculated using a function that generally provides a higher score 1) the shorter the duration of the second route relative to the first route, 2) the higher the urgency level, 3) the higher the exception use level, 4) the fewer the public safety vehicle traffic exceptions are used along the second route, 5) the less pedestrian traffic along the second route, 6) the less vehicle traffic along the second route, and the like. These are merely exemplary factors that may be considered as part of the function and, in some examples, more or fewer factors are considered. Additionally, these various factors in the function may be weighted such that one or more have greater impact on the score than others. Such a weighting may be non-linear. As the route generator 210 considers additional factors beyond route duration, in some examples, the second route is not identified as the preferred route 230 even though the second route may have a shorter duration than the first route. In some embodiments, if the first route and the second route have equivalent distances, durations, or both, the route generator 210 identifies the preferred route as the route that uses the fewest public safety vehicle traffic exceptions (e.g., the first route).

Returning to FIGS. 5 and 6, in one example, the second duration of the second route 605 may be less than the first duration of the first route 505, however, the urgency level may be low and the pedestrian density along the second route 605 may be higher than the pedestrian density along the first route 505. In such an example, the routing function 225 may identify the first route 505 as the preferred route 230, even though the second duration of the second route 605 is lower. In another example, the second duration of the second route 605 may be less than the first duration of the first route 505, the urgency level may be high, and the current weather is clear. In such an example, the routing function 225 may identify the second route 605 as the preferred route 230, even when the pedestrian density along the first route 505 is higher than the pedestrian density along the second route 605.

Returning to FIG. 4, in block 445, the preferred route 230 is output. In some embodiments, the preferred route 230 is output to the user-interface 310 of the navigation device 120. For example, the preferred route 230 may be graphically displayed, audibly conveyed, or both, to guide a user of the navigation device 120 to the second location. The preferred route 230 may also be output to external devices, such as a dispatch controller over the network 125.

In block 450, the navigation device 120 determines whether to update or re-check the preferred route 230 identified in block 440. When the navigation device 120 determines not to update the preferred route 230, the method 400 cycles back to block 445 and the preferred route 230 continues to be output. When the navigation device 120 determines to update the preferred route 230, the method 400 cycles back to block 405 to once again receive the first location. In some embodiments, at block 450, the navigation device 120 determines whether a new route is necessary based on a plurality of factors. In such an embodiment, the plurality of factors may include, whether changes occurred to one or more route conditions, whether a predetermined time period has passed since a current preferred route was identified, whether the navigation device 120 has received new input from a user, whether the user has moved away from the preferred route 230, and the like, which may be determined by the navigation device 120. For example, upon the navigation device 120 determining that one or more route conditions has changed on the preferred route 230 (for example, using information from the information database 115), that a certain amount of time passed since identification of the preferred route 230, and/or that the current location of the navigation device 120 is away from the preferred route 230, the navigation device 120 may cycle back to block 405 to begin updating the route. The navigation device 120 may determine that the current location of the navigation device 120 is away from the preferred route 230 by comparing current location data from the location detection device 312 to the preferred route 230 and determining that the current location is at least a predetermined distance away from the preferred route 230.

As discussed above, in some embodiments, one or more routes in addition to the first and second routes are generated in method 400, and the route generator 210 identifies the preferred route 230 from these three or more routes. For example, block 430 may be repeated to generate the one or more additional routes that are generated based on the second set of routing rules 140, but which employ different public safety vehicle traffic exceptions than the second route. Accordingly, such additional routes may have different durations and other characteristics than the second route, which may lead the route generator 210 to identify one of the additional routes as the preferred route 230 in block 440.

In some embodiments, one or more additional locations beyond the first and second location are received in the method 400 (e.g., in a new block (not shown) between block 410 and block 415). These additional locations may be waypoints whereby the first and second route start at the first location, pass through the waypoints, and end at the second location. In some embodiments, such waypoints may be used as further location inputs by the mapping algorithms of blocks 425 and 430. In some embodiments, the method 400 is executed for each leg of a route, defined by the waypoints, from the first location to the second location. For example, in a scenario with a first location, second location, and a waypoint in between, the method 400 may be executed to identify a preferred route from the first location to the waypoint, and the method 400 may be executed again to identify another preferred route from the waypoint to the second location.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing navigational routing, the method comprising the steps of:
   determining, at a controller, a first route from a first location to a second location, the determination of the first route using a first set of routing rules following standard traffic conventions for civilian vehicles;
   determining, at the controller, a second route from the first location to the second location, the determination of the second route using a second set of routing rules applicable to a public safety vehicle, the second set of routing rules different from the first set of routing rules;
   accessing, at the controller, route information related to the second route;
   comparing, at the controller and based on the route information, the first route and the second route;
   identifying, at the controller, a preferred route based on the comparison; and
   outputting the identified preferred route.

2. The method of claim 1, wherein the step of accessing, at the controller, route information related to the second route includes receiving the route information from an external computer.

3. The method of claim 1, wherein the step of identifying the preferred route includes determining a difference between a first travel duration and a second travel duration.

4. The method of claim 1, wherein the step of accessing route information related to the second route includes receiving information related to at least one selected from the group consisting of a traffic density, a pedestrian density, current weather, time-of-day, driving patterns along the second route, driving patterns during a selected time-of-day, one or more traffic laws violated by a suspect, a distance of a traffic violation, whether a current user will be a first to arrive at the second location, an exception use level, and an urgency level.

5. The method of claim 1, wherein the step of accessing information related to the second route includes receiving information from to at least one selected from the group consisting of an external computer, real-time video, one or more records databases, and one or more map databases.

6. The method of claim 1, wherein the second route using the second set of routing rules applicable to a public safety vehicle violates civilian traffic conventions while following rules applicable to a public safety vehicle.

7. The method of claim 1, further comprising
   receiving, at the controller, the first location;
   receiving, at the controller, the second location;
   receiving, at the controller, map data; and
   receiving, at the controller, additional information related to at least one selected from the group consisting the first route and the second route.

8. The method of claim 1, further comprising determining, at the controller, a third route from the first location to the second location, the calculation of the third route using at least one selected from the first set of routing rules and the second set of routing rules.

9. The method of claim 1, further comprising determining the second set of routing rules to use for determining the second route based on at least one selected from the group consisting of: a type of incident at the second location and a type of public safety vehicle for which the second route is intended.

10. The method of claim 1, wherein at least one selected from the group consisting of the first route and the second route includes a waypoint between the first location and the second location.

11. The method of claim 1, further comprising determining, at the controller, whether to update the preferred route based on at least one selected from the group consisting of: an elapsed time, a change in a route condition of the preferred route, and a determination that a current position is a predetermined distance from the preferred route.

12. A method for providing navigational routing, the method comprising the steps of:
   determining, at a controller, a first route from a first location to a second location, the determination of the first route using a first set of routing rules following standard traffic conventions for civilian vehicles;
   determining, at the controller, a second route from the first location to the second location, the determination of the second route using a second set of routing rules applicable to public safety vehicles different from the first set of routing rules;

accessing, by the controller, additional information related to the second route, the additional information including real-time condition information associated with the second route;

comparing, at the controller and based on the additionally information, the first route and the second route;

identifying, at the controller, a preferred route based on the comparison; and outputting the identified preferred route.

13. The method of claim 12, wherein the step of accessing, at the controller, additional information related to the second route includes receiving the additional information from an external computer.

14. The method of claim 12, wherein the step of identifying the preferred route includes determining a difference between a first travel duration and a second travel duration.

15. The method of claim 12, wherein the step of accessing additional information related to the second route includes receiving real-time condition information associated with the second route related to at least one selected from the group consisting of a traffic density, a pedestrian density, current weather, time-of-day, driving patterns along the second route, driving patterns during a selected time-of-day, one or more traffic laws violated by a suspect, a distance of a traffic violation, whether a current user will be a first to arrive at the second location, an exception use level, and an urgency level.

16. The method of claim 12, wherein the step of accessing information related to the second route includes receiving real-time condition information associated with the second route from to at least one selected from the group consisting of an external computer, real-time video, one or more records databases, and one or more map databases.

17. The method of claim 12, wherein the second route using the second set of routing rules applicable to public safety vehicles violates civilian traffic conventions while following rules applicable to public safety vehicles.

18. A navigation device for providing navigational routing, the navigation device comprising:

a memory; and an electronic processor electrically coupled to the memory, the electronic processor configured to:

determine a first route from a first location to a second location, the determination of the first route using a first set of routing rules following standard traffic conventions for civilian vehicles, determine a second route from the first location to the second location, the determination of the second route using a second set of routing rules applicable to public safety vehicles different from the first set of routing rules, access route information related to the second route, compare, based on the route information, the first route and the second route, identify a preferred route based on the comparison, and output the identified preferred route.

19. The navigation device of claim 18, wherein the electronic processor accesses the route information related to the second route by receiving the route information from an external computer.

20. The navigation device of claim 18, wherein the information related to the second route includes at least one selected from the group consisting of a traffic density, a pedestrian density, current weather, time-of-day, driving patterns along the second route, driving patterns during a selected time-of-day, one or more traffic laws violated by a suspect, a distance of a traffic violation, whether a current user will be a first to arrive at the second location, an exception use level, and an urgency level.

21. The navigation device of claim 18, wherein the second route using the second set of routing rules applicable to public safety vehicles violates standard traffic conventions while following rules applicable to public safety vehicles.

22. The navigation device of claim 18, wherein the electronic processor determines a third route from the first location to the second location, the calculation of the third route using at least one selected from the first set of routing rules and the second set of routing rules.

23. The navigation device of claim 18, wherein the electronic processor determines the second set of routing rules to use for determining the second route based on at least one selected from the group consisting of a type of incident at the second location and a type of public safety vehicle for which the second route is intended.

24. The navigation device of claim 18, wherein at least one selected from the group consisting of the first route and the second route includes a waypoint between the first location and the second location.

25. The navigation device of claim 18, wherein the electronic processor determines whether to update the preferred route based on at least one selected from the group consisting of: an elapsed time, a change in a route condition of the preferred route, and a determination that a current position is a predetermined distance from the preferred route.

* * * * *